April 18, 1950 W. M. BACON 2,504,621

ENCIPHERING AND DECIPHERING DEVICE FOR SECRET TELEGRAPH SYSTEMS

Filed Dec. 3, 1946 5 Sheets-Sheet 1

INVENTOR
W. M. BACON
BY J. M. Holahan
ATTORNEY

April 18, 1950 W. M. BACON 2,504,621

ENCIPHERING AND DECIPHERING DEVICE FOR SECRET TELEGRAPH SYSTEMS

Filed Dec. 3, 1946 5 Sheets-Sheet 2

INVENTOR
W. M. BACON
BY J. M. Holahan
ATTORNEY

April 18, 1950 W. M. BACON 2,504,621

ENCIPHERING AND DECIPHERING DEVICE FOR SECRET TELEGRAPH SYSTEMS

Filed Dec. 3, 1946 5 Sheets-Sheet 3

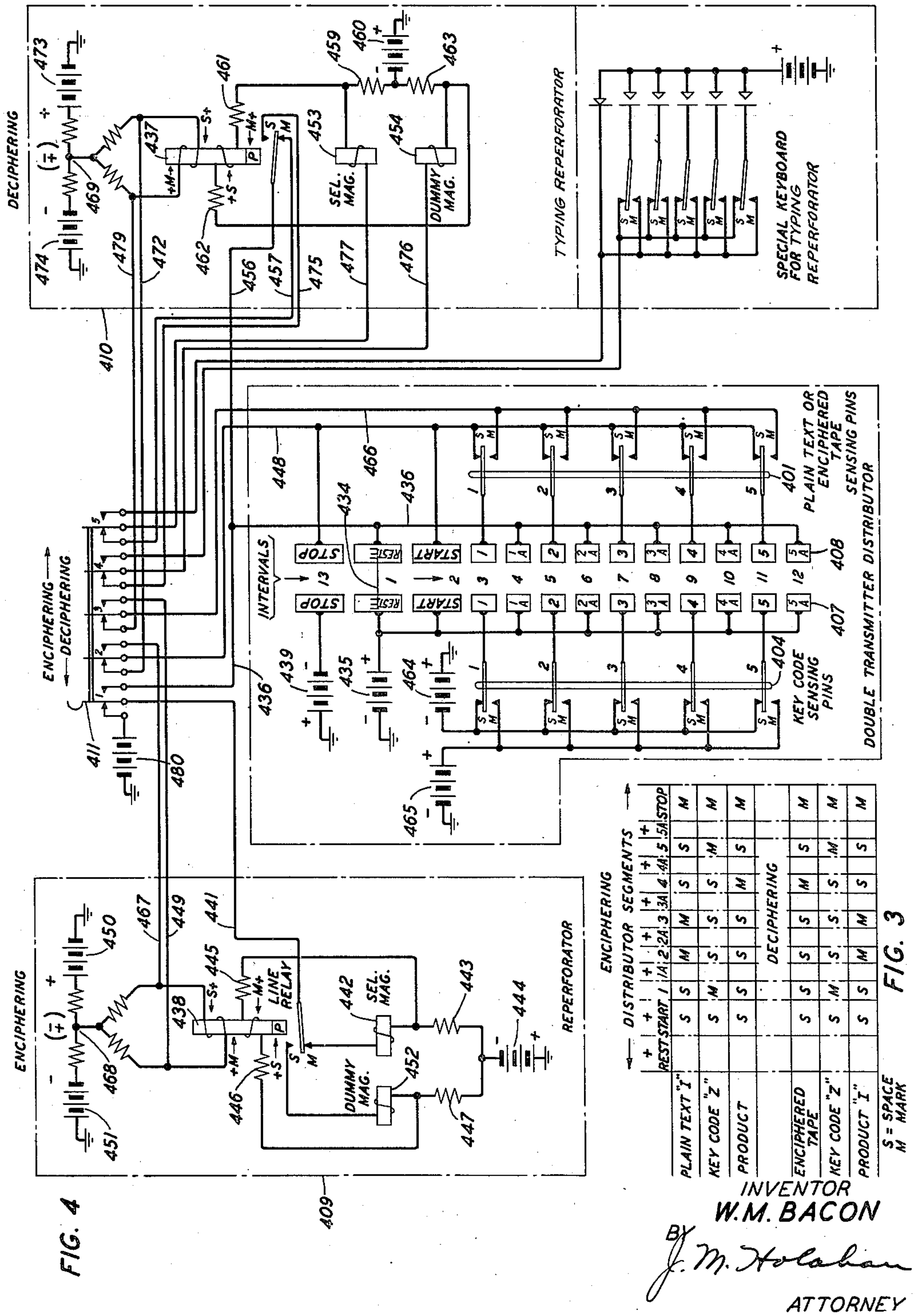
FIG. 3, FIG. 4

| | + REST | + START | 1 | + 1A | 2 | + 2A | 3 | + 3A | 4 | + 4A | 5 | + 5A | STOP |
|---|---|---|---|---|---|---|---|---|---|---|---|---|---|
| ENCIPHERING | | | | | | | | | | | | | |
| PLAIN TEXT "I" | | S | S | | M | | M | | S | | S | | M |
| KEY CODE "Z" | | S | M | | S | | S | | S | | M | | M |
| PRODUCT | | S | S | | S | | S | | M | | S | | M |
| DECIPHERING | | | | | | | | | | | | | |
| ENCIPHERED TAPE | | S | S | | S | | S | | M | | S | | M |
| KEY CODE "Z" | | S | M | | S | | S | | S | | M | | M |
| PRODUCT "I" | | S | S | | M | | M | | S | | S | | M |

← DISTRIBUTOR SEGMENTS →

S = SPACE
M MARK

INVENTOR
W.M. BACON
BY J. M. Holahan
ATTORNEY

April 18, 1950 W. M. BACON 2,504,621
ENCIPHERING AND DECIPHERING DEVICE
FOR SECRET TELEGRAPH SYSTEMS
Filed Dec. 3, 1946 5 Sheets-Sheet 4

INVENTOR
W. M. BACON
BY J. M. Holahan
ATTORNEY

INVENTOR
W. M. BACON
BY J. M. Holahan
ATTORNEY

UNITED STATES PATENT OFFICE 2,504,621

ENCIPHERING AND DECIPHERING DEVICE FOR SECRET TELEGRAPH SYSTEMS

Walter M. Bacon, New York, N. Y., assignor to Bell Telephone Laboratories, Incorporated, New York, N. Y., a corporation of New York Application December 3, 1946, Serial No. 713,651

10 Claims. (Cl. 178—22)

This invention relates to secret telegraph systems and more particularly to an enciphering and deciphering device adapted for use in such secret telegraphic systems.

In telegraph systems, messages are transmitted and received in any well-known code, and if intercepted in this condition, during the course of transmission, they are intelligible to any one familiar with the code. However, in secret telegraph systems the message signals are altered before transmission over the line, and when intercepted in their altered form are unintelligible. At the transmitting end of a secret system, the intelligible messages prepared at the transmitter are, before being impressed on the line, enciphered by means of other signals of what is generally known as a key code, and the enciphered messages with their altered signals are transmitted over a line so that any interception on the line will cause to be received by the interceptor unintelligible messages. At the final receiving end, these unintelligible messages are deciphered by means of other signals identical with those of the key code at the transmitting end, and the deciphered messages are recorded to produce the messages as originally prepared.

Heretofore in secret telegraph systems difficulties were experienced in developing a completely shielded device for transmitting messages to the enciphering set or for receiving messages from the deciphering set for recordation.

At the sending end where the transmitting device may be a keyboard or an automatic tape transmitter or a transmitting relay of a sending teletypewriter, or at the receiving end where the receiving device may be a line relay or a repeating relay or the selector magnet of a receiving teletypewriter, it has been found that each device, upon the "make" or "break" of its operating contacts radiates a short, sharp voltage pulse. These pulses when radiated in a location which is comparatively free from other electrical disturbances and in which a ciphering or deciphering set is operated, may be surreptitiously or otherwise received, or "picked-up," by a radio receiving device located in an adjacent room or within some other short distance or at a much greater distance along a power or signal wire which is connected to or passes close by the receiving set, and are recorded as pulses by an oscillograph. From these pulses appearing on an oscillogram may be constructed the signals of the complete message as originally prepared.

An object of the present invention is to cipher and decipher messages through a single rotary distributor of special type cooperating with two tape sensing mechanisms.

Considerable work has been done on secret telegraph systems to prevent the radiation from the plain text signal impulses of voltage pulses that may be picked-up and read at a distance by means of radio receivers. While successful radiation prevention methods have been developed, the problems involved are complex and there is no assurance that radiation will not take place when the equipments are in use in the field as the doors may not be tightly closed or all the shields may not be properly installed due to carelessness on the part of the operator.

According to the present invention there is provided a room circuit device adapting a single code tape for use in telegraph cipher systems for preventing an intelligible pick-up, by means of a radio receiver, of voltage pulses radiated by a teletypewriter transmitter or receiver during the process of preparing a perforated record of an enciphered message for future reference or future transmission over an outgoing line, or a printed record of a deciphered message. The room circuit device is further adapted to prepare by means of a special keyboard a printed or perforated plain text message, or both, for future enciphering. The method of transmitting directly from a special keyboard directly to an outgoing line is described in Bacon's copending application, Serial No. 653,256, filed March 9, 1946, which issued as Patent No. 2,463,236 on March 1, 1949.

The enciphering operation may be divided into two parts, which consist of (1) perforating a tape with plain text message signals, and (2) enciphering the message so perforated on the plain text tape by mixing, or interacting, it with a key code perforated on a second tape, by means of a single rotary distributor of a special type, whereby a new combination of the two, that is, the message code and the key code, is impressed on a typing reperforator to perforate on a third tape such combination as an enciphered message. The deciphering operation may also be divided in two parts which consist of (1) placing a tape containing an enciphered perforated message on the sensing pins of a transmitter, and (2) placing the tape containing the perforated key code on the sensing pins of a second transmitter, the transmitters respectively transmitting the enciphered message code and the key code simultaneously through the single rotary distributor of special type to impress it on a teletypewriter wherein the original plain text message is recorded. The distributor of special type comprises two segmented rings interconnected by a brush for effecting the interaction of two codes transmitted from two tape sensing mechanisms.

A main feature of the invention is the provision of a compact telegraphic transmitting and receiving device for enciphering and deciphering messages for secret communication, comprising two automatic tape sensing mechanisms, or transmitters, simultaneously operating in conjunction with the rotary distributor of special type and telegraphic receiving apparatus equipped with dummy circuits identical with the regular selector circuits whereby voltage pulses radiated by plain text signals are masked by other pulses radiated by the dummy circuits to prevent detection of a communication.

The invention will be better understood by reference to the following detailed description taken in connection with the accompanying drawings in which:

Fig. 3 shows in tabulated form the products obtained when the marking and spacing impulses of a character of a key code are superimposed on the marking and spacing impulses of a character of a deciphered, or plain text, message and an enciphered message;

Fig. 4 shows a schematic circuit layout for the apparatus shown in Figs. 1 and 2, wherein the single distributor is shown developed to furnish a clearer view of the various circuit paths provided for the enciphering and the deciphering operations;

Figure 1:
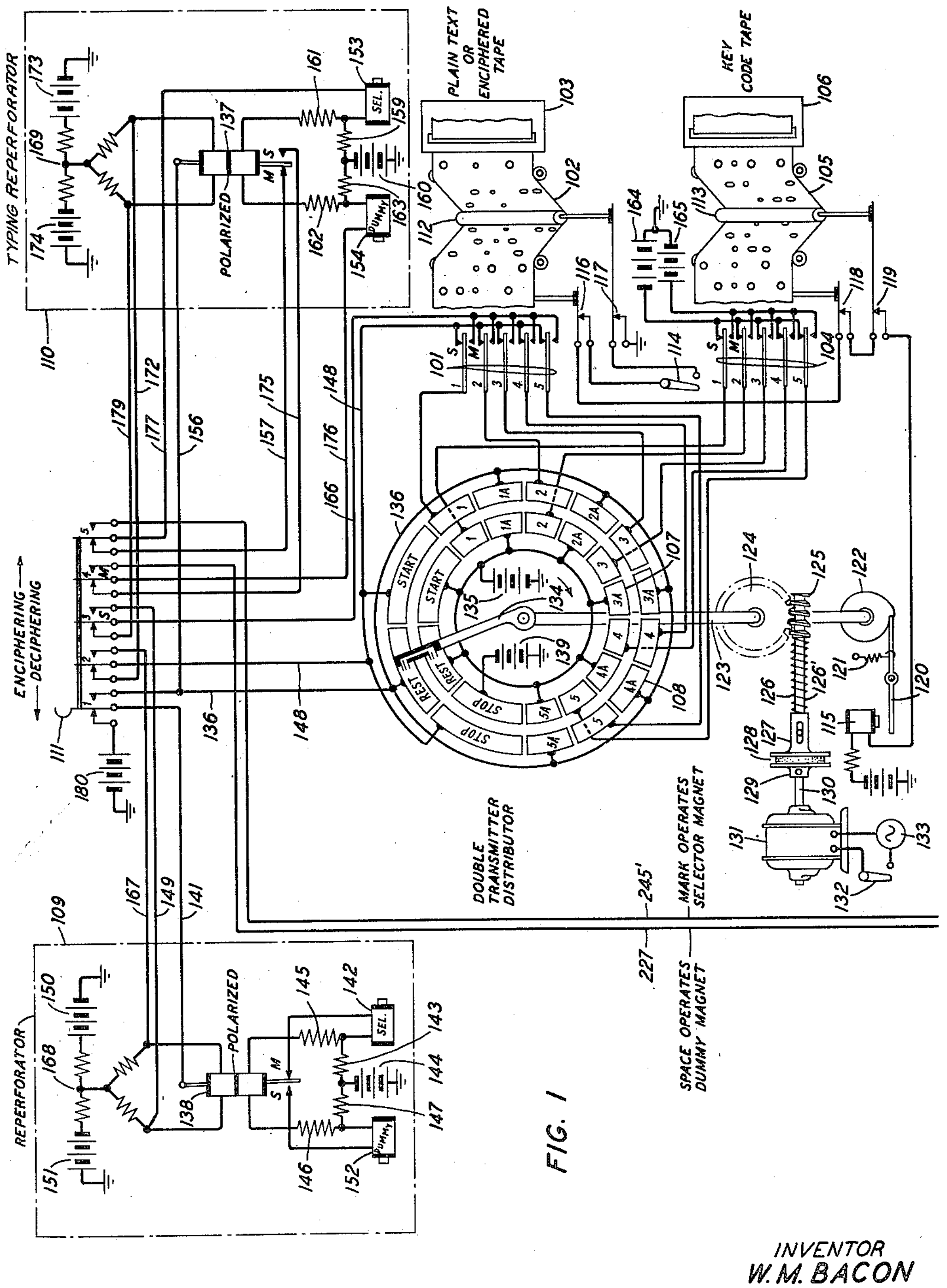
Fig. 1 shows a telegraphic transmitting and receiving device comprising two automatic tape transmitters operating in conjunction with the rotary distributor of special type to record at a typing reperforator a deciphered message and at a reperforator an enciphered message.
Figure 2:
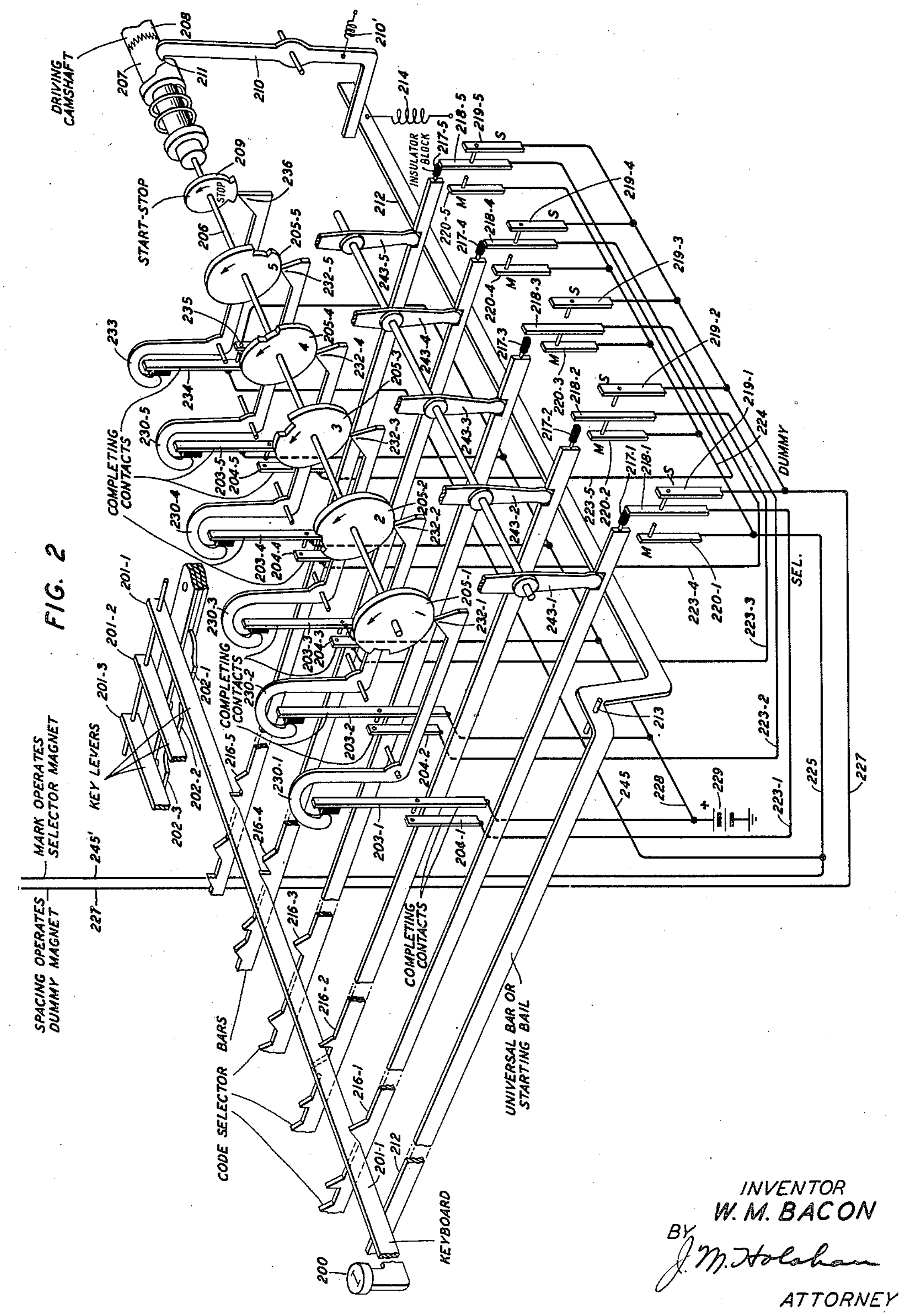
Fig. 2 shows a special keyboard which is preferably arranged for use with the teletypewriter shown in Fig. 1, when it is desired to prepare either a printed or perforated plain text message, or both.

All the apparatus for the transmitting and receiving equipment shown in Figs. 1 and 2 is preferably arranged in one room wherein it is desired to record enciphered and deciphered messages, both outgoing and incoming, prepare plain text messages for reference purposes or for future transmission through an enciphering device as enciphered messages to an outgoing line.

The signal code used herein for both message signals and key code signals is the start-stop, five-unit permutation code which comprises five selecting pulses used in various combinations of "current" and "no current" intervals, namely, "mark" and "space," depending upon the signal transmitted, each group of five selecting pulses is preceded by a "start," or space, pulse and followed by a "stop," or mark, pulse, the latter pulse being used to maintain synchronism between the transmitting and receiving apparatus at opposite ends of a transmission system. The key code may be any group of start-stop signals regardless of whether or not such group constitutes a definite, intelligible statement, but it is essential that the key codes used at opposite ends of the system be identical.

The use of reference characters has been kept to a definite plan. Thus all numerals in each of the figures are prefixed by a digit indicating the figure in which the element is located, for example, all reference characters in Fig. 1 are numerals between 100 and 199, the hundred numeral designating the figure. Like parts have corresponding reference characters except for the hundred numerals.

Referring to Fig. 1, automatic tape transmitter 101 is arranged to receive tape 102 perforated with a message from unit 103 which may be a separate keyboard perforator, a typing reperforator adapted to receive from another line a message in plain text or an enciphered message, or a tape guide for perforated tape either in an unbroken length or consisting of several pieces spliced together, containing a plain text message or an enciphered message. Preferably unit 103 receives perforated tape previously prepared for transmission. Automatic tape transmitter 104 is arranged to receive perforated tape 105 from unit 106 which serves as a guide for tape 105 perforated with signals of the key code. Each signal of the key code on tape 105 is impressed through contacts 104 on the segments of the inner ring 107 to be superimposed on a signal simultaneously impressed on the segments of outer ring 108 of the transmitter-distributor according to the present invention, through transmitting contacts 101 by tape 102.

When tape 102 is perforated with signals corresponding to the plain text message the superimposition of the signals of the key code produces at reperforator 109 an enciphered message prepared for delivery or storing purposes, or transmission over another line circuit, but when tape 102 contains an enciphered message then the superimposition of its signals on the signals of the key code produces a deciphered message at a printing teletypewriter such as diagrammatically shown in box 110.

Fig. 3 shows in tabulated form the changes effected in the selecting impulses of a signal character representing the letter "I" when such signal impulses are generated simultaneously with the selecting impulses of a signal combination of a key code. The simultaneous generation of two characters causes the signal combination of one character to be superimposed on the signal combination of the other character so that a different product is transmitted instead of the signal combination of either or both of the characters originally prepared. For example, should a selecting impulse which is a mark in a signal combination in key code perforated in tape 105 to be superimposed on a selecting impulse which is also a mark in a signal combination perforated in message tape 102 which message may be in plain text form or enciphered, the product will be a mark. Should the corresponding selecting impulses on the two tapes be spacing the product would again be a mark. However, should the corresponding selecting pulses be different, that is, one marking and the other spacing, the product will be a space. In other words, impulses of like nature when superimposed on each other produce a marking impulse and impulses of unlike nature when superimposed on each other produce a spacing impulse. In Fig. 3 under "Enciphering" are shown the selecting impulses of the letter "I" to be space, mark, mark, space and space and the corresponding selecting impulses of a character, such as letter "Z," in the key code are mark, space, space, space and mark representative of the code that is to be superimposed on the code for the letter "I." The product resulting from this superimposition and prepared to be transmitted, instead of the signal combination representative of letter "I" or letter "Z," is constituted of the following selecting impulses: space, space, space, mark and space. Under "Deciphering" the same rule applies, except that the superimposition operates in the reverse order. For example, the same signal combination, such as that for letter "Z," of the key code is superimposed, but in this case the superimposition is on a signal combination comprising the following selecting impulses: space, space, space, mark and space, which are the same as those contained in the product obtained in the enciphering operation. The product obtained in the deciphering operation comprises space, mark, mark, space and space which together with the regular start and stop impulses constitute the signal combination of letter "I," the letter produced in the deciphered message.

The apparatus employed in Figs. 1 and 2 may be of the types disclosed in the United States patents hereinafter referred to:

Transmitting units respectively comprising transmitting contacts 101 arranged to be controlled by perforated tape 102 and transmitting contacts 104 arranged to be controlled by tape 105, and associated with transmitter distributor 136, are, with certain modifications as shown and as will be hereinafter described, of the type disclosed in United States Patents 2,055,567 and 2,262,014, respectively granted to E. F. Watson on September 29, 1936, and W. Y. Lang on November 11, 1941.

Reperforator 109 may be of the typing reperforator type disclosed in United States Patent 2,255,794, granted to R. A. Lake on September 16, 1941, but modified as hereinafter described.

Teletypewriter 110 is preferably of the keyboard perforator-transmitter-printer type comprising a printing teletypewriter combined with keyboard perforator and transmitter preferably of the type disclosed in United States Patent 1,965,602, granted to R. A. Lake on July 10, 1934, but modified as hereinafter described.

The above-mentioned patents show in detail the transmitting, the selecting, the printing and the perforating mechanism for use with teletypewriter signaling, and therefore these patents are hereby made a part of this application as if fully set forth herein.

Switch 111 is provided for changing the device, or arrangement, from enciphering operation to deciphering operation and vice versa. The switch when operated toward the right sets the device in condition for enciphering the plain text message signals with the key code signals whereby the record produced is unintelligible. The switch when operated toward the left sets the arrangement in condition for deciphering an unintelligible enciphered record by means of the key code to produce the original plain text message signals from which an intelligible record is obtained. The special keyboard transmitter arrangement shown in Fig. 2 and disclosed in Bacon's copending application, Serial No. 653,256, supra, is arranged for connection through switch 111 to teletypewriter 110. This special keyboard together with its tape perforator may be part of teletypewriter 110. It is a modification of the ordinary keyboard such as shown in the disclosure of Morton Patent Re. 20,330, supra.

Circuit changes as shown in the apparatus for both reperforator 109 and teletypewriter 110 are required when they are used with the arrangement shown in Fig. 1. The receiving side of each apparatus is changed in that the line relay is operated on a polar basis and the product of this relay is sent either to the printer selector magnet or to a dummy magnet in an operating circuit which has an impedance equal to that of the operating circuit for the printer selector magnet.

The operating circuit of the selector magnet and the dummy magnet in each of reperforator 109 and teletypewriter 110 includes two parallel paths for respectively operating the selector and the dummy magnet of its own machine. The two parallel paths at each machine have a common path extending through the lower winding of its line relay so that the operating current for either of its two magnets is utilized for holding its line relay in the position to which the relay was last operated by the operating current in the upper winding of the relay. The resistors in the paths for operating the magnets are of low, but equal, resistance values and the resistors in the common path are of considerably higher, but also equal, resistance values. The current permitted to flow through the lower winding of each line relay will be just sufficient to hold the line relay in the position to which it was last operated providing there is no current flowing in the upper winding of the relay at the time. Accordingly, in reperforator 109, resistors 145 and 146 are of considerably higher resistance values than those of resistors 143 and 147 and in teletypewriter 110, resistors 161 and 162 are of considerably higher resistance values than those of resistors 159 and 163.

The special transmitter-distributor, during each revolution of its rotatable brush arm 134 interconnects, in turn, the corresponding sensing contacts of the two sensing mechanisms represented by transmitting contact sets 101 and 104 whereby grounded negative battery 164 and grounded positive battery 165 furnish current for operating the line relays of machines 109 and 110 in accordance with the polarity of each of the selecting impulses of the signal combination resulting from combining the corresponding selecting impulses of the two signal combinations simultaneously supplied from transmitting contact sets 101 and 104. The sensing contacts are shown as transfer elements represented by armatures Nos. 1 to 5 in each of sets 101 and 104 and each of these elements of each of sets 101 and 104 engages one or the other of its marking (M) and spacing (S) contacts depending on whether or not a perforation in its transmitting tape appears at such point of engagement at the time a signaling combination is being impressed on the distributor ring, the signal combinations in tape 102 being impressed on ring 108 and those in tape 105 being impressed on ring 107. Each of the two segmented rings 107 and 108 of the face of the special distributor contains a rest segment, a start segment, a stop segment and five pairs of segments. One segment of each pair on one ring when connected to its corresponding segment of a pair on the other ring, by the rotating brushes, serves to transmit a selecting impulse for operating the line relay in one or the other of machines 109 and 110, and the other segment of each pair when connected to its corresponding segment of the pair on the other ring serves to transmit current for operating the selector magnet or the dummy magnet depending on the position to which the associated line relay is operated. The current serving to operate the magnets is also utilized to hold the line relay operated until the next selecting impulse is received. In ring 107 the stop segment is connected to grounded negative battery 139, the rest segment, the start segment and segments 1A, 2A, 3A, 4A and 5A are connected to grounded positive battery 135 and segments Nos. 1 to 5 are respectively connected to armatures Nos. 1 to 5 of transmitting contact set 104. In ring 108 the stop and the start segments are connected to conductor 148, the rest segment and segments Nos. 1A, 2A, 3A, 4A and 5A are connected to conductor 136 and segments Nos. 1 to 5 are respectively connected to armatures 1 to 5 of transmitting contact set 101. Segments Nos. 1 to 5 on rings 107 and 108 serve to complete the circuits over which the five selecting impulses of a signal combination are successively transmitted to operate a line relay, and segments Nos. 1A, 2A, 3A, 4A and 5A on the same rings serve to complete circuits for transmitting current for operating the selector magnet and the dummy magnet in machines 109 and 110.

All segments of ring 107 are radially arranged with their corresponding segments of ring 108. When brush arm 134 is in its normal position, that is in contact with the rest segments of rings 107 and 108, a circuit is closed from grounded positive battery 135, the rest segments interconnected by the brushes and rotatable arm 134, conductor 136, thence over two parallel paths. Either of these paths may be selected for use by operating switch 111 to the position desired. When switch 111 is operated to its left-hand position, the path selected is that which extends over the left-hand contact and spring No. 1 of switch 111, conductor 141, armature and marking contacts of polarized line relay 138, through the winding of selector magnet 142, resistor 143 of low resistance value, to grounded negative battery 144 whereby selector magnet 142 is normally held in its operated position. When switch 111 is operated to its right-hand position, the path selected is that which extends from grounded positive battery 229 (Fig. 2), conductor 228, terminal 235 normally in engagement with contact spring member 234, conductors 245 and 245′, right-hand contact and spring No. 5 of switch 111, conductor 177, through the winding of selector magnet 153, resistor 159 of low resistance value to grounded negative battery 160 whereby selector magnet 153 is normally held in its operated position. With switch 111 in its right-hand position, grounded positive battery 135 is substituted for grounded battery 180 for normally maintaining selector magnet 142 operated, at this time in a path extending over the rest segments normally engaged by the brushes on arm 134, conductor 136, right-hand contact and spring No. 1 of switch 111, conductor 141, armature and marking contact of line relay 138, through the winding of selector magnet 142, resistor 143 of low resistance value, to ground positive battery 144. When switch 111 is in its left-hand position, the current flowing through the operating circuit for selector magnet 142 also flows in a much lesser degree through a parallel path extending over resistor 145 of high resistance value, through the lower, or holding, winding of line relay 138, another high resistance resistor 146, resistor 147 of low resistance value, to grounded negative battery 144. This lesser current flowing through the lower winding of relay 138 maintains relay 138 in its marking, or right-hand, position during the normal, or idle, periods of typing reperforator 109 inasmuch as the circuit extending through the upper winding of relay 138 is at this time opened by the brushes on arm 134 of the double distributor resting on the rest segments of rings 107 and 108. Likewise, when switch 111 is in its right-hand position the current flowing through the operating circuit for selector magnet 153, a current also flows, but in a much lesser degree, through a parallel path extending over resistor 161 of high resistance value, through the lower, or holding, winding of line relay 137, resistor 162 of high resistance value, resistor 163 of low resistance value, to grounded negative battery 160, and relay 137 is thereby normally maintained in its marking position under similar conditions.

METHOD OF OPERATION

*Operation of preparing a plain text message from the special keyboard*

To prepare a plain text message at the special keyboard shown in Fig. 2 and record it either in printed or perforated form, or both, at teletypewriter 110, switch 111 is operated to its enciphering, or right-hand, position wherein the keyboard is connected by means of conductors 245′ and 227 to the winding of selector magnet 153 and the winding of dummy magnet 154 of teletypewriter 110 as shown. For a detailed description of the operation of the special keyboard and the consequent operation of selector magnet 153 and dummy magnet 154, whereby the dummy magnet, upon operating, serves to mask "pick-up" signals radiated by the operation of the selector magnet, reference may be had to Bacon's copending application, Serial No. 653,256, supra. In the copending application relays 121 and 122, respectively, correspond to magnets 153 and 154 of the present application.

However, a brief description of the operation of the special keyboard shown in Fig. 2 will be given herein.

After a check-up, to see that tape-stop switch 114 is open and control switch 111 is closed in its right-hand position, the keys of the special keyboard may be operated. For example, should a key, such as key 200 representing the letter "I" on the keyboard, be operated momentarily, key lever 201—1 would be momentarily depressed against the tension of spring member 202—1 to move selector, or code, bars 216—2 and 216—3 toward the left, and selector bars 216—1, 216—4 and 216—5 toward the right unless these bars are already in their respective desired positions. The selector bars 216—1, 216—4, and 216—5, upon moving toward the right, cause their respectively associated contact spring members 218, such as members 218—1, 218—4 and 218—5 to engage "space" terminals 219—1, 219—4 and 219—5, respectively. The selector bars 216—2 and 216—3, upon moving toward the left, cause their respectively associated spring contact members 218—2 and 218—3 to engage their "mark" terminals 220—2 and 220—3, respectively. The depression of key lever 201—1 or any other key lever of the keyboard, causes universal bar 212 to rotate in a counter-clockwise direction around pin 213 and the free end of the universal bar moves upwardly against the tension of coil spring 214 to cause latch member 210 to disengage throw-out cam 211. When latch member 210 moves out of engagement with throw-out cam 211, driven clutch member 207 is permitted to mesh with driving clutch member 208 and cam shaft 206 starts rotating through one revolution, or cycle. Should there be no further operation of the keyboard following the operation of the key 200 latch member 210 having immediately returned to normal under the influence of coil spring 210′, would engage throw-out cam 211 at the end of the cycle of cam shaft 206 and the cam shaft would again be locked in its normal position, selector magnet 153 would be maintained operated in its marking position and dummy magnet 154 would be maintained released in its spacing position. Each of contact spring members 218 remains in engagement with its "space" terminal 219 or its "mark" terminal 220 to condition a signaling path for transmitting a selecting impulse of a permutation code signal to either dummy magnet 154 or selector 153, depending on whether such impulse is a "space" or a "mark". These contact spring members remain in engagement with their respective terminals during the rotation of cam shaft 206 and until another key, such as key 200, is momentarily depressed to give the code bars another setting. The contact spring members 218 are of the transfer contact type so that when a key is depressed causing the selection for the signal combination to be established these keyboard transfer contacts, or elements, will immediately assume either their spacing or marking positions, depending on the character to be transmitted. These transfer contacts are so arranged that they neither "make" or "break" the transmission current circuit to cause the transmission of the text signal current impulses and therefore do not cause to be radiated the consequent voltage impulses. However, in order to complete transmission of the signal combination conditionally established by the transfer contacts, a cam shaft operating on a basis of sending five impulses for each signal combination, is provided and while the cam shaft is rotating through one revolution the transmission current circuit "breaks" and "makes" before and after each of the selecting impulses of the signal combination, the nature of each impulse transmitted depending on whether its corresponding transfer contact is in engagement with its marking terminal 220 or its spacing terminal 219. In other words, in transmitting the start-stop, five selecting unit permutation code signal, the space and the mark selecting pulses of each signal combination are first conditionally established by the simultaneous operation of code bars 216—1 to 216—5 and their respectively associated contact spring members 218—1 to 218—5 and then individually transmitted by the subsequent operation of each of the contact spring members 203—1 to 203—5, in turn, during a revolution of shaft 206. In general teletypewriter practice, the start and the five selecting impulses are of unit length in duration and the stop impulse is 1.42 times longer. However, in the applicant's arrangement the selecting impulses are shortened ten per cent as will be hereinafter described. There are in all, during a revolution of cam shaft 206, seven consecutive intervals of operations. Normally selector magnet 153 is operated in a circuit traceable from grounded positive battery 229, conductor 228, terminal 235 in engagement with contact spring member 234, conductors 245 and 245′, right-hand contact and spring member No. 5 of switch 111, conductor 177, through the winding of selector magnet 153, resistor 159 of low resistance value, to grounded negative battery 160.

The operation resulting from the momentary depression of key 200 which is assumed herein to cause the signal combination for letter "I" to be transmitted, may be described in the following manner:

(1) At the beginning of the start impulse, or first interval, the contact between contact spring member 234 and terminal member 235 is opened and remains open for the duration of the five selecting impulses of the signal combination and a start, or space, impulse is thereby sent to the operating circuit for selector magnet 153. Selector magnet 153 being normally energized, releases in response to the space impulse. The opening of the contacts between spring contact member 234 and terminal member 235 is due to the removal of the restraint of switch-shifter 233 when the stop segment of start-stop cam 209 leaves the peak portion 236 of shifter 233 and the start, or first interval, sector together with the sectors corresponding to the five selecting impulses, of the cam being of reduced diameter, engage the peak portion 236. The dummy magnet 154 which is normally in a released condition remains in a released condition for the duration of the first interval but not necessarily for the duration of the intervals corresponding to the five selecting impulses.

(2) At the end of the start impulse, peak portion 232—1 of switch-shifter 230—1 continues in engagement with the periphery of normal diameter of cam 205—1 for a short angular distance, say about five per cent of the unit impulse length of the first selecting impulse in the second interval, and then engages the indentation on cam 205—1 to remove the restraint of switch-shifter 230—1 whereby the contact between contact spring member 203—1 and terminal 204—1 is permitted to close. This contact remains closed until peak portion 232—1 reaches the end of the indentation, which is a short angular distance, say another five per cent, before the end of the second interval, that is, the first selecting pulse for the letter "I" set up at the keyboard has a duration of about 90 per cent of the unit impulse length. The shortened pulse is transmitted in a circuit extending from grounded positive battery 229, contact spring member 203—1, terminal 204—1, conductor 223—1, contact spring member 218—1 and "space" terminal 219—1, conductor 227, right-hand contact and spring No. 4 of switch 111, conductor 176, through the winding of dummy magnet 154, to grounded negative battery 160. Dummy magnet 154 operates for the duration of the shortened impulse and selector magnet 153 remains released.

(3) When the peak portion 232—1 of switch-shifter 230—1 leaves the indentation of cam 205—1 as stated above, it continues in engagement with the periphery of normal diameter of cam 205—1, but peak portion 232—2 of switch-shifter 230—2 which is in engagement with the periphery of normal diameter of cam 205—2 at the beginning of the third interval, reaches a point, say about five per cent of the unit impulse length, beyond the beginning of the third interval where peak portion 232—2 engages the indentation of cam 205—2 to close the contact between contact spring member 203—2 and terminal 204—2 during the third interval. The contact so closed remains closed for 90 per cent of the duration of the unit impulse length, whereby the second selecting impulse is also shortened for transmission over the circuit traceable from grounded positive battery 229, conductor 228, contact spring member 203—2, terminal 204—2, conductor 223—2, contact spring member 218—2, "mark" terminal 220—2, conductors 224, 225, 245', right-hand contact and spring No. 5 of switch 211, conductor 177, through the winding of selector magnet 153, to grounded negative battery 160. Selector magnet 153 operates for the duration of the shortened second selecting impulse which is marking and dummy magnet 154 released at the end of the immediately preceding shortened impulse, when peak portion 232—1 left the indentation of cam 205—1, as stated above.

(4) Near the end of the third interval, when peak portion 232—2 of switch-shifter 230—2 leaves the indentation of cam 205—2, it continues in engagement with the periphery of normal diameter of cam 205—2 but peak portion 232—3 of switch-shifter 230—3, which is in engagement with the periphery of normal diameter of cam 205—3 at the beginning of the fourth interval, reaches a point about five per cent of the unit impulse length beyond the beginning of the fourth interval, where it engages the indentation on cam 205—3 to close the contact between contact spring member 203—3 and terminal 204—3 during the fourth interval, that is, for 90 per cent of the duration of a unit impulse length, whereby the third selecting impulse is also shortened. The shortened third selecting impulse is transmitted over the circuit traceable from grounded positive battery 229, conductor 228, contact spring member 203—3, terminal 204—3, conductor 223—3, contact member 218—3, "mark" terminal 220—3, conductors 224, 225 and 245', right-hand contact and spring No. 5 of switch 211, conductor 177, through the winding of selector magnet 153, to grounded negative battery 160. Selector magnet 153 operates in response to and for the duration of the shortened third selecting impulse which is also marking, and dummy magnet 154 remains released.

(5) Near the end of the fourth interval, when peak portion 232—3 of switch-shifter 230—3, leaves the indentation of cam 205—3, it continues along the periphery of normal diameter of cam 205—3, but peak portion 232—4 of switch-shifter 230—4 reaches a point about five per cent of the unit impulse length beyond the beginning of the fifth interval where it engages the indentation on cam 205—4 to close the contact between contact spring member 203—4 and terminal 204—4 during the fifth interval, that is, for 90 per cent of the duration of a unit impulse length whereby the fourth selecting impulse is shortened. The shortened fourth selecting impulse is transmitted over the circuit traceable from grounded negative battery 229, conductor 228, contact spring member 203—4, terminal 204—4, conductor 223—4, contact member 218—4, "space" terminal 219—4, conductor 227, right-hand contact and spring No. 4 of switch 111, conductor 176, through the winding of dummy magnet 154, to grounded negative battery 160. Dummy magnet 154 operates in response to and for the duration of the shortened fourth selecting impulse which is spacing, and selector magnet 153 remains released.

(6) Near the end of the fifth interval, when peak portion 232—4 of switch-shifter 230—4 leaves the indentation of cams 205—4, it continues along the periphery of normal diameter of cam 205—4, but peak portion 232—5 of switch-shifter 230—5 which is in engagement with the periphery of normal diameter of cam 205—5 at the beginning of the sixth interval, reaches a point, about five per cent of the unit impulse length, beyond the beginning of the sixth interval where it engages the indentation on cam 205—5 to close the contact between contact spring member 203—5 and terminal 204—5 during the sixth interval, that is for 90 per cent of the duration of a unit impulse length whereby the fifth selecting impulse is shortened. The shortened fifth selecting impulse is transmitted over the circuit traceable from grounded positive battery 229, conductor 228, contact spring member 203—5, terminal 204—5, conductor 223—5, contact spring member 218—5, space terminal 219—5, conductor 227, right-hand contact and spring No. 4 of switch 111, conductor 176, through the winding of dummy magnet 154, to grounded negative battery 160. Dummy magnet 154 again operates but now in response to and for the duration of the shortened fifth selecting pulse which is also spacing, and selector magnet 153 remains released.

(7) Near the end of the sixth interval, when the peak portion 232—5 of switch-shifter 230—5 leaves the indentation of cam 205—5, at a point about five per cent of the unit impulse length before the beginning of the seventh interval, it continues along the periphery of normal diameter of cam 205—5, but peak portion 236 of switch-shifter 233 which has, during the transmission of the five selecting impulses, been in engagement with the periphery of reduced diameter of cam 209 now reaches the beginning of the seventh interval where it again engages the "stop" segment of start-stop cam 209 to again close the contact between contact spring member 234 and terminal 235 during the seventh and last interval to transmit a stop impulse which is always marking. The stop impulse is transmitted over the circuit traceable from grounded positive battery 229, conductor 228, terminal 235, contact spring member 234, conductors 245 and 245', right-hand contact and spring No. 5 of switch 111, conductor 177, through the winding of selector magnet 153, to grounded negative battery 160. Selector magnet 153 is operated by the stop impulse and dummy magnet 154 was released when peak portion 232—5 left the indentation of cam 205—5 as stated above. Selector magnet 153 remains operated until the keyboard is again operated.

During the revolution of shaft 206 for the transmission of the start-stop signal combination for letter "I," namely, start, space, mark, mark, space, space and stop selector magnet 153 operates for only about 90 per cent of the duration of each of the unit length mark intervals of the second and third selecting impulses and dummy magnet 154 operates for about 90 per cent of the duration of each of the unit length space intervals of the first, fourth and fifth selecting impulses. In accordance with the general teletypewriter practice the selector and the dummy magnet are released during the start impulse interval and during the stop impulse interval, the selector magnet is operated and the dummy magnet is released.

The changes in currents for effecting the operation and release of each of these two magnets during the transmission of the seven impulses representing letter "I" radiate a short, sharp, pulse at the beginning and ending of each of the seven pulses. These radiated pulses when received by a radio receiver and impressed on an oscillograph produce an oscillogram showing a pattern which is uniform for all signal combinations that may be transmitted from the special keyboard. The operation of selector magnet 153 will cause the recordation of the transmitted message at teletypewriter 110, and should teletypewriter 110 including the special keyboard of Fig. 2 be of the keyboard-perforator-printer type, the message would be perforated in a tape in addition to being printed by the teletypewriter, and the tape so perforated may be inserted in unit 103 for enciphering purposes.

When switch 111 is operated to its right-hand position both typing reperforator 109 and teletypewriter 110 may be simultaneously operated, reperforator 109 being operated from the special distributor and teletypewriter 110, from the special keyboard.

*Enciphering operation*

The enciphering operation is started by inserting in unit 103 a perforated tape, such as tape 102 in which is perforated signal combinations representative of a plain text message. The message perforated may be that just described under the caption of "Operation of preparing a plain text message from the special keyboard" and recorded on teletypewriter 110. Tape 102 is drawn under taut-tape arm 112 and over the sensing pins, or transfer elements, of transmitting contact set 101. About the same time perforated tape 105 which is perforated with a key code is inserted in unit 106 and this tape is drawn under taut-tape arm 113 and over sensing pins, or transfer elements, of transmitting contact set 104. Tape 105 may be in loop form, that is, arranged in a complete loop and permanently installed in the tape transmitter, but it is preferable for the sake of secrecy to install the key code tape for each operation of enciphering a message. Switch 111 is of the locking type and must be manually operated to its right-hand position for an enciphering operation. Tape-stop switch 114, also of the locking type must be operated to its closed position to close the operating circuit for distributor start magnet 115. It will be noted that the operating circuit for magnet 115 includes sixth pin contacts 116 and taut-tape contacts 117 for tape 102 and sixth pin contacts 118 and taut-tape contacts 119 for tape 105 so that should any one contact pair open, start magnet 115 would release to stop the rotating brush arm 134 of the double distributor at the end of a revolution.

Start magnet 115, when operated, withdraws armature extension 120 against the tension of coil spring 121 from cam 122 which, with gear 124 is fixedly mounted on rotatable shaft 123. Gear 124 meshes with worm 125 which forms an integral part of rotatable shaft 126. Rotatable shaft 126 is the driven shaft of clutch 128. On the free end of shaft 126 is slidably mounted by means of the slot and pin arrangement clutch element 127 whereby element 127 is capable of being moved in and out of engagement with friction clutch 128 under the influence of the tension in coil spring 126' in which shaft 126 serves as a core. The driving part of clutch 128 is element 129 which is fixedly mounted on driving shaft 130. Shaft 130 is rotatably driven by motor 131 which is continuously operating after switch 132 is operated to its closed position to connect alternating current source 133 to the motor operating circuit as shown.

When perforated tapes 102 and 105 are in their proper places with respect to transmitting contact sets 101 and 104, switch 111 is operated to its enciphering position, switch 132 is closed to condition the double distributor for operation and then tape-stop switch 114 is closed to start operating the transmitters, whereof transmitting contact sets 101 and 104 are parts. The tape sensing mechanism represented by transmitting contacts of set 101 of one transmitter and the transmitting contacts of set 104 of the other transmitter, both of which mechanisms includes a plurality of sensing fingers, operate their respective sets of sensing fingers in accordance with the perforations, or control indicia, in tapes 102 and 105 to control the simultaneous setting up of impulses symbolic of two characters, as represented in the upper portion of Fig. 3. Neither of the two characters is reproduced as hereinbefore described in connection with Fig. 3. Simultaneous setting up of the two characters causes the signal combination of one character to be superimposed on the signal combination of the other character so that a different product, or signal combination, is produced instead of either or both of the original characters.

For a description of the operation of the circuit involved in enciphering a message, reference is now made to Fig. 4 which is a schematic circuit layout for the apparatus shown in Figs. 1 and 2. The reference characters in Fig. 4 are, with the exception of the numeral prefixes which indicate the figure in which the designated elements are located, the same as those shown in Fig. 1, for example, typing reperforator 109 and teletypewriter 110 in Fig. 1 are designated in Fig. 4 by the reference characters 409 and 410, respectively. No further reference is made to the description herein of the special keyboard shown schematically in the lower right-hand corner of Fig. 4, as being a part of teletypewriter 410 because it is believed that the description hereinbefore given of the operation of the special keyboard under the caption "Operation of preparing a plain text message from the special keyboard" is sufficient.

In Fig. 4 the distributor is shown with its two segmented rings 407 and 408 developed and the brushes on rotating arm 434 normally positioned on the rest segments. The corresponding segments of the two rings are fixedly located in the same sector each ring comprising a start segment, segments Nos. 1, 1A, 2, 2A, 3, 3A, 4, 4A, 5 and 5A, a stop segment and a rest segment. The corresponding segments of the two rings are simultaneously contacted, in turn, by the brushes on arm 434 in rotating through one revolution. The start segments, segments Nos. 1, 2, 3, 4 and 5 and the stop segments complete, in turn, the operating circuit of line relay 438 whereby the operating current momentarily flows through the upper winding of relay 438, in one or the other of opposite directions, depending upon the nature of the impulse resulting from combining an impulse of a signal combination received from transmitting contacts of set 404 and an impulse of another signal combination received from transmitting contacts of set 401. When the impulse resulting in the output of the distributor is a space the direction of current is from right to left through the upper winding of line relay 438 and when it is a mark the direction of current is from left to right. The rest segments and segments Nos. 1A, 2A, 3A, 4A and 5A, in turn, complete the operating circuit for either selector magnet 442 or dummy magnet 452 which circuit includes a high resistance locking, or holding, path extending through the lower winding of line relay 438, the current in the lower winding flowing in one or the other of opposite directions in accordance with the spacing or marking nature of the signal impulse which last operated the line relay 438, through the upper winding.

When brush arm 434 begins to rotate and its brushes engage the start segments, a circuit closes from grounded positive battery 435, the start segments interconnected by the brushes, conductor 448, spring No. 2 and its right-hand contact of switch 411, conductor 467, through the upper winding of line relay 438, to point 468 of grounded negative potential furnished by batteries 450 and 451. The direction of current through the upper winding of relay 438 is from right to left and relay 438 operates, in response to the start pulse, to its spacing, or upper, position. The spacing, or upper, contact of relay 438 is connected to the winding of dummy magnet 452, but dummy magnet 452 does not operate at this time because its operating circuit is open, the circuit being traceable over a path extending from grounded negative battery 444, resistor 447 of low resistance value, winding of dummy magnet 452, spacing contact and armature of relay 438, spring No. 1 and its right-hand contact of switch 411, conductor 436, and at this point the open condition exists inasmuch as the brushes of rotating arm 434 are passing over the start segments which are not included in the circuit.

When the brushes on rotating arm 434 reach the No. 1 segments of rings 407 and 408, the circuit including the upper winding of relay 438 is again closed and the direction of current therein is determined by the positions of the No. 1 transfer elements of transmitting contact sets 401 and 404, which positions are determined by the nature of the first selecting pulse of each of the signal combinations respectively passing over the transmitting contact sets 401 and 404 at the time. The direction of the current flowing through the upper winding of relay 438 again determines the position to which the relay armature becomes operated, whereby a circuit is accordingly conditioned to operate either the selector magnet 442 or dummy magnet 452. When the brushes on rotating arm 434 move out of engagement with the No. 1 segments of rings 407 and 408 and into engagement with segments Nos. 1A, the circuit including the upper winding of relay 438 is opened and the circuit previously conditioned is closed to operate either selector magnet 442 or dummy magnet 452, depending upon the position of the relay armature at the time. The magnet operating circuit is traceable from grounded positive battery 435, segments Nos. 1A of rings 407 and 408 interconnected by the rotating brushes, conductor 436, right-hand contact and spring No. 1 of switch 411, conductor 441, armature in engagement with either its marking, or lower, contact or its spacing, or upper, contact of relay 438, through the winding of the magnet connected to the contact so engaged, its associated resistor of low resistance value, to grounded negative battery 444. The current flowing in the circuit just traced also flows in the high resistance path parallel to the circuit just traced which path extends through its associated resistor of high resistance value, through the lower winding of relay 438, another associated resistor of high resistance value, its associated resistor of low resistance value, to grounded negative battery 444. Because of the high resistance values of the resistors adjacent to the lower winding, current flowing in the lower winding of relay 438 is very light but of sufficient strength to maintain the armature of relay 438 in the position to which it was last operated by the current flowing through the upper winding of the relay. Therefore, the lower winding of relay 438 serves to hold the relay in the position to which it was last operated and hold it in such position until the current in the upper winding flows in the opposite direction to that which operated the relay to its immediately previous position.

Figure 5:
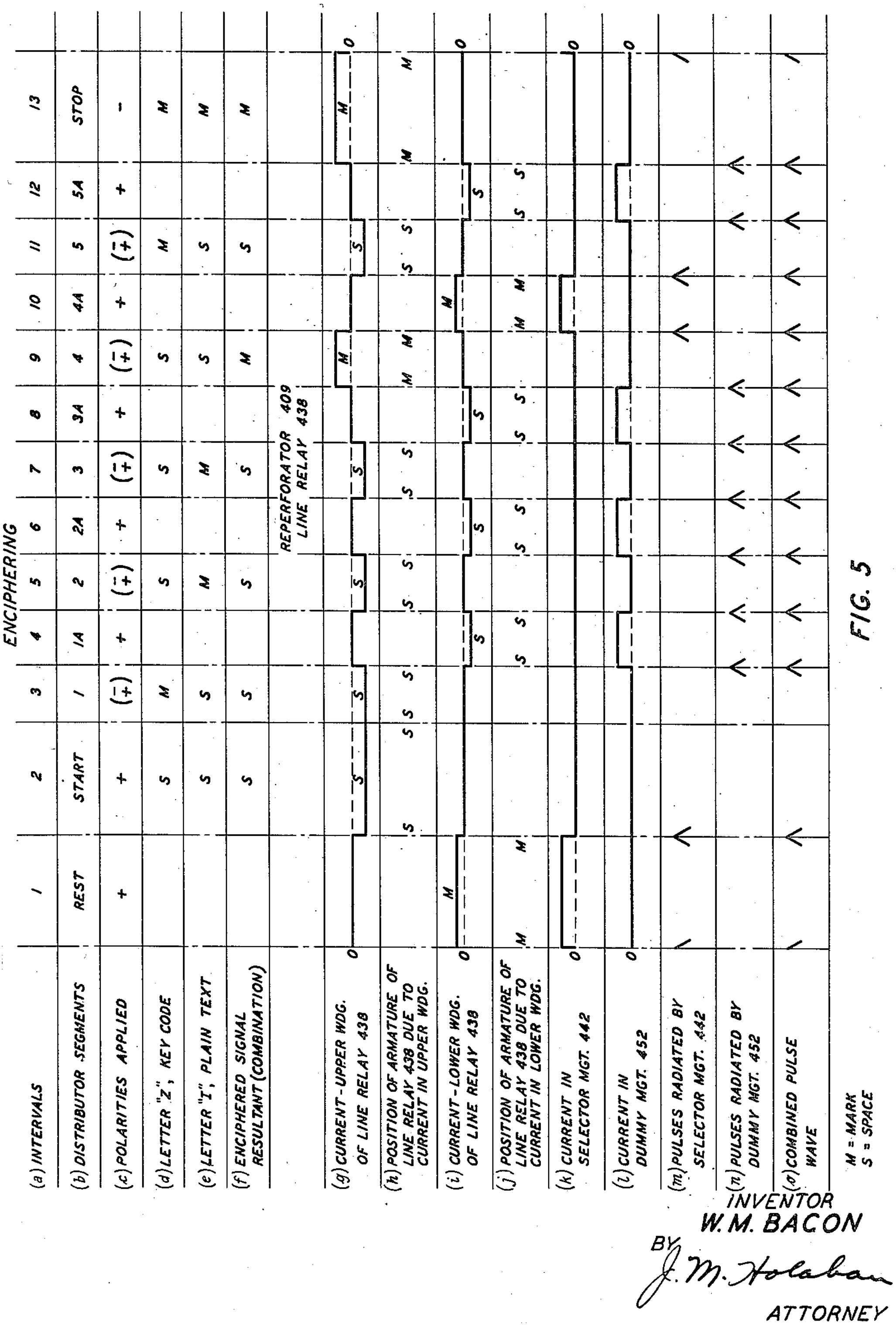
Fig. 5 is a diagrammatic showing of a signal wave and the voltage pulse pick-up waves involved in the enciphering process.

A clear understanding of the enciphering operation is had by referring to the signal wave chart shown in Fig. 5. Fig. 5 shows lines *a* to *o*, which furnish the following information:

Line *a* shows the number of intervals, consecutively numbered, wherein different functions are performed by the rotating brushes moving over the corresponding segments of rings 407 and 408 of the double distributor.

Line *b* shows the designation of the segments of each of rings 407 and 408 for transmitting a start-stop, five-unit permutation code signal combination. The brushes on rotatable arm 434 are normally in engagement with the rest segments. When the brushes start rotating they pass over, in turn, the start segments, segments No. 1 corresponding to the first selecting impulse of the signal combinations, segments 1A referred to herein as holding segments, segments No. 2 which correspond to the second selecting impulse, segments No. 2A which are another pair of holding segments, segments No. 3 which correspond to the third selecting impulse, segments No. 3A which are still another pair of holding segments, segments No. 4 which correspond to the four selecting impulse, segments No. 4A which are another pair of holding segments, segments No. 5 which correspond to the fifth selecting impulse, segments No. 5A which are another pair of holding segments and the stop segments to which the negative polarity of grounded negative battery 439 is applied for restoring relay 438 to its marking position just before the brushes engage and come to rest on the rest segments.

Line *c* shows the polarities successively applied to the segments of ring 407 during the time the brushes are rotating through one revolution. Positive polarity from battery 435 is always applied to the rest segment, the start segment, and each of hold segments Nos. 1A, 2A, 3A, 4A and 5A. Positive polarity from grounded battery 465 or negative polarity from grounded battery 464 is successively applied to each of selecting segments Nos. 1, 2, 3, 4 and 5, depending on whether the mark, or lower, contact or the space, or upper, contact of transmitting contact set 404 is engaged by its respective transfer element of those designated Nos. 1 to 5. Negative polarity from battery 439 is always connected to the stop segment.

Line *d* shows the signal combination for the letter "Z" which represents a character of the "key code." The start-stop combination for letter "Z," including the start and the stop impulses consists of space, mark, space, space, space, mark and mark, the start and the stop impulses being space and mark, respectively, in accordance with the usual practice.

Line *e* shows the signal combination for the letter "I," a letter of the plain text message. The start-stop combination for letter "I" consists of space, space, mark, mark, space, space and mark and in this case also the start and the stop impulses are always space and mark, respectively.

Line *f* shows the combination of impulses transmitted to the upper winding of line relay 438, these impulses being the resulting combination, or product, produced by combining each of the selecting impulses of letter "Z" with its corresponding one of the selecting impulses of letter "I." In other words, the selecting impulses of a signal combination of the key code as applied by transmitting contact set 404 are superimposed, in turn, on their respectively corresponding selecting impulses of a signal combination of the plain text message as applied by transmitting contact set 401 for transmission over the operating circuit of relay 438, which circuit includes the upper winding of the relay. It will be noted as hereinbefore stated in the description of Fig. 3 that when a selecting impulse is combined with another impulse of like nature, the resultant is a "mark" but if the selecting impulse is combined with a selecting impulse of a different nature, the resultant will be a "space." These changes affect only the selecting impulses of a signal combination, but the "start" impulse and the "stop" impulse remain the same, that is "space" and "mark," respectively.

Line *g* shows the nature and duration of each of the current impulses of line *f* as applied to the upper winding of line relay 438.

When the brushes on rotating arm 434 rotate through one revolution to transmit the signal combination shown in line *f* there are performed various functions which are indicated in lines *h* to *o* in Fig. 5. These functions are as follows:

(1) Normally the brushes on arm 434 are in engagement with the rest segments, and no current at this time flows in the upper winding of relay 438, as indicated in interval No. 1 of line *g*, because the relay operating circuit is open at the distributor segments. However, at this time there is closed a circuit traceable from the positive pole of grounded battery 435, the rest segments, conductors 436, right-hand contact and spring No. 1 of switch 411, conductor 441, armature and marking contact of relay 438, through the winding of selector magnet 442, resistor 443, to grounded negative battery 444, to furnish a current, as indicated in interval No. 1 of line *k* whereby selector magnet 442 is normally maintained in an operated condition. This current, at the same time flows through the parallel high resistance path extending through the lower winding, in a right to left direction as indicated in interval No. 1 of line *i*, to normally hold relay 438 in its marking position as indicated by the two "M's" shown in line *j*.

(2) In interval No. 2 when the brushes engage the start segments, positive polarity of grounded battery 435 is applied to a circuit extending over the start segments, conductor 448, spring No. 2 and its right-hand contact of switch 411, conductor 467, through the upper winding, from right to left, of relay 438, to point 468 of negative potential furnished by batteries 450 and 451 to permit a spacing current indicated in line *g*, to operate the armature of relay 438 to its spacing position as indicated by the two "S's" shown in line *h*.

(3) In interval No. 3 when the brushes engage the No. 1 segments to pick up the first selecting impulse of each of the signal combinations for letters "Z" and "I," that is, "mark" at transmitting contact set 404, and "space" at transmitting contact set 401, positive polarity of grounded battery 465 is applied over the marking contact and transfer element No. 1 of transmitting contact set 404, No. 1 segments of rings 407 and 408, transfer element No. 1 in engagement with the spacing contact of transmitting contact set 401, conductor 448, spring member No. 2 and its right-hand contact of switch 411, conductor 467, through the upper winding, from right to left, of relay 438, to point 468 of negative potential to transmit a space impulse as indicated in line *g*, and relay 438 is therefore held in its spacing position as indicated in line *h*.

(4) In interval No. 4 when the brushes are in engagement with the Nos. 1A segments, the current flowing through the upper winding, from right to left, of relay 438 drops to zero value as indicated in line *g*, and a space current now flows through a circuit traceable from grounded positive battery 435, segments Nos. 1A, conductor 436, right-hand contact and spring No. 1 of switch 411, conductor 441, armature and spacing contact of relay 438, through the winding of dummy magnet 452, as indicated in line *l*, resistor 447, to grounded negative battery 444 to permit a spacing current, as indicated in line *i* to flow through the lower winding of relay 438 for the duration of the interval No. 4 to hold the armature of relay 438 in its spacing position as indicated by the two "S's" in line *j*.

(5) In interval No. 5 when the brushes are in engagement with the Nos. 2 segments a circuit is closed extending from grounded negative battery 464, spacing contact and transfer element No. 2 of transmitting contact set 404, segments No. 2, transfer element No. 2 and marking contact of transmitting contact set 401, conductor 466, spring No. 3 and right-hand contact of switch 411, conductor 449, through the upper winding, from left to right, of relay 438, to point 468 which at this time is of positive potential, to furnish the second selecting impulse which is of spacing current as indicated in line *g*, to operate relay 438 to its spacing position as shown in line *h*.

(6) In interval No. 6 when the brushes come into engagement with segments No. 2A, a circuit is closed extending from grounded positive battery 435, segments Nos. 2A, conductor 436, right-hand contact and spring No. 1 of switch 411, conductor 441, armature and spacing contact of relay 438, through the winding of dummy magnet 452, resistor 447, to grounded negative battery 444, and the spacing current indicated in line *l*, operates dummy magnet 452 and flows from left to right through the lower winding of relay 438 as indicated in line *i* to maintain relay 438 in its spacing position as indicated in line *j*.

(7) In interval No. 7 the rotating brushes engage segments No. 3 to close a circuit extending from grounded negative battery 464, spacing contact and transfer element No. 3 of transmitting contact set 404, No. 3 segments, transfer element No. 3 and marking contact of transmitting contact set 401, conductor 466, spring No. 3 and its right-hand contact of switch 411, conductor 449, through the upper winding, from left to right, of relay 438, to point 468 of positive potential, and the third selecting impulse which is also of spacing current as indicated in line *g*, retains the relay in its spacing position as indicated in line *h*.

(8) In interval No. 8 the brushes engage segments Nos. 3A to close a circuit from grounded positive battery 435, segments Nos. 3A, conductor 436, right-hand contact and spring No. 1 of switch 411, conductor 441, armature and spacing contact of relay 438, through the winding of dummy magnet 452, resistor 447, to grounded negative battery 444 and the spacing current indicated in line *l*, operates dummy magnet 452 and flows from left to right through the lower winding of relay 438 as indicated in line *i* to retain the relay in its spacing position as indicated in line *j*.

(9) In interval No. 9 the rotating brushes engage segments No. 4 to close a circuit extending from grounded negative battery 464, spacing contact and transfer element No. 4 of transmitting contact set 404, segments No. 4, transfer element No. 4 and spacing contact of transmitting contact set 401, conductor 448, spring No. 2 and its right-hand contact of switch 411, conductor 467, through the upper winding, from left to right, of relay 438 to point 468 of positive potential, and the fourth selecting impulse which is of marking current as indicated in line *g* operates relay 438 to its marking position as indicated in line *h*.

(10) In interval No. 10 the brushes engage segments Nos. 4A to close a circuit traceable from grounded positive battery 435, segments Nos. 4A, conductor 436, right-hand contact and spring No. 1 of switch 411, conductor 441, armature and marking contact of relay 438, through the winding of selector magnet 442, resistor 443, to grounded negative battery 444 and the marking current indicated in line *k* operates selector magnet 442, the operating current for selector magnet 442 also flowing, from right to left, through the lower winding of relay 438 to maintain the relay in its marking position as indicated in line *j*.

(11) In interval No. 11 the brushes engage segments No. 5 to close a circuit extending from grounded positive battery 465, marking contact and transfer element No. 5 of transmitting contact set 404, segments No. 5, transfer element No. 5 and spacing contact of transmitting contact set 401, conductor 448, spring No. 2 and right-hand contact of switch 411, conductor 467, through the upper winding, from right to left, of relay 438 to the point 468 of negative potential and the fifth selecting impulse is of spacing current as indicated in line *g*, operates relay 438 to its spacing position as indicated in line *h*.

(12) In interval No. 12 the brushes engage segments Nos. 5A to close a circuit from grounded positive battery 435, segments Nos. 5A, conductor 436, right-hand contact of spring No. 1 of switch 411, conductor 441, the armature and spacing contact of relay 438, through the winding of dummy magnet 452, resistor 447, to grounded negative battery 444, and the spacing current operates dummy magnet 452, as indicated in line *l*, the operating current for dummy magnet 452 also flowing through the lower winding, from left to right, of relay 438 to maintain relay 438 in its spacing position as indicated in line *j*.

(13) In interval No. 13 the brushes engage the stop segments to close a circuit extending from grounded negative battery 439, the stop segments, conductor 448, spring No. 2 and its right-hand contact of switch 411, conductor 467, through the upper winding, from right to left, of relay 438, to point 468 of positive potential and the "stop" impulse which is always of marking current as indicated in line *g*, operates relay 438 to its marking position as indicated in line *h*.

(14) Upon returning to interval No. 1 the brushes again come to rest on the rest segments to close a circuit traceable from grounded positive battery 435, the rest segments, conductor 436, right-hand contact and spring No. 1 of switch 411, conductor 441, armature and marking contact of relay 438, through the winding of selector magnet 442, resistor 443, to grounded negative battery 444, and the marking current indicated in line *k* operates selector magnet 442, the operating current for selector magnet 442 also flowing through the lower winding, from right to left, of relay 438 to again normally maintain the relay in its marking position as indicated in line *j* until another signal combination is received.

By observing the intervals wherein current is flowing in either selector magnet 442 or dummy magnet 452 as indicated in lines *k* and *l*, it will be noted that the operating current has a duration of one interval only so that each of these magnets will release at the termination of each interval wherein the magnet is energized. It will be noted in lines *m* and *n* that a short, sharp voltage pulse is radiated each time either magnet operates or releases. Therefore, at each possible transition of a signal wave corresponding to the signal combination indicated in line *f*, a short, sharp voltage pulse is radiated which might be picked up and recorded by a radio receiver and oscillograph located within range of the enciphering equipment shown in Fig. 1. In line *o* is indicated the combined pick-up at the radio receiver radiated by the operating circuits of both magnets. The combined pick-up wave will be the same for all signal combinations whereby detection of a secret message during the enciphering operation is practically eliminated.

*Deciphering operation*

The deciphering operation is started by inserting in unit 103 a perforated tape, such as tape 102, in which are perforated signal combinations representative of an enciphered message. The enciphered message perforated on tape 102, may be similar to that resulting from the enciphering operation and recorded on reperforator 409 as just described under the caption of "Enciphering operation." A key code tape, such as perforated tape 105, is inserted in unit 106. Tapes 102 and 105 are drawn over the sensing pins of their respective transmitting contact sets 101 and 104 in a manner similar to that also hereinbefore described. Switch 111 is normally in its deciphering or left-hand, position.

When perforated tapes 102 and 105 are in their proper places with respect to transmitting contacts 101 and 104 and switch 111 is in its deciphering position, switch 132 is closed to condition the distributor for operation and then tape stop switch 114 is closed to start operating the transmitters whereof transmitting contact sets 101 and 104 are parts. The tape sensing mechanism represented by transmitting contact set 101 of one transmitter and the transmitting contact set 104 of the other transmitter operate their respective sets of sensing fingers in accordance with the perforations, or control indicia, in both the enciphered perforated tape 102 and the key code perforated tape 105 to control the simultaneous setting up of impulses symbolic of two signal combinations as represented in the lower portion of Fig. 3. Simultaneous setting up of two signal combinations causes one signal combination to be superimposed on the other combination so that a different product, or signal combination, is produced. In this case, that is, in the deciphering operation, the resulting product should be the signal combination corresponding to a character in the plain text message as originally prepared and before being subjected to the enciphering operation.

For a description of the operation of the circuits involved in deciphering messages, reference is again made to Fig. 4. Switch 111 is switch 411 in Fig. 4 and it will be noted in Fig. 4 that when switch 411 is in its deciphering position, perforator 410 is connected to the double transmitting distributor and therefore perforator 410 is now connected to receive the deciphered plain text message as the message was originally prepared.

As in the enciphering operation, hereinbefore described, the brushes on rotating arm 434 of the double distributor are normally positioned on the rest segments, the corresponding segments of the two rings 107 and 108 are fixedly located in the same sector and are simultaneously contacted in turn, by the brushes on rotating arm 434 during each revolution. The start segments, selecting segments Nos. 1, 2, 3, 4 and 5 and the stop segments complete in turn, the operating circuit of line relay 437 whereby the operating current flows in the upper, or operating, winding of relay 437 in one or the other of two opposite directions depending upon the nature of the impulse resulting from combining an impulse of a signal combination received from transmitting contact set 404 and an impulse of another signaling combination received from transmitting contact set 401. When the impulse resulting in the output of the distributor is a space its direction of current is from right to left through the upper winding of relay 437 and when it is a mark its direction of current is from left to right. The rest segments and hold segments Nos. 1A, 2A, 3A, 4A and 5A, in turn, complete the operating circuit for either selector magnet 453 or dummy magnet 454, which circuit includes a high resistance locking, or holding, path extending through the lower winding of line relay 437, the current in the lower winding flowing in one or the other of opposite directions in accordance with the spacing or marking nature of the signal impulse which last operated the line relay 437 through its upper winding.

When brush arm 434 begins to rotate and its brushes engage the start segments, a circuit closes from grounded positive battery 435, the start segments interconnected by the brushes, conductor 448, spring No. 2 and its left-hand contact of switch 411, conductor 472, through the upper winding, from right to left, of line relay 437, to point 469 of negative potential furnished by batteries 473 and 474. The direction of current through the upper winding of relay 437 is from right to left, and relay 437 operates, in response to the start impulse, to its spacing, or upper, position. The spacing, or upper, contact of relay 437 is connected to the winding of dummy magnet 454, but dummy magnet 454 does not operate at this time because its operating circuit is open, the operating circuit of dummy magnet 454 being traceable in a path extending from grounded negative battery 460, resistor 463, winding of dummy magnet 454, conductor 476, spring No. 4 and left-hand contact of switch 411, conductor 475, spacing, or upper, contact and armature of relay 437, conductors 456 and 436 to a point where the open condition exists inasmuch as the brushes of rotating arm 434 are at this time passing over the start segments which are not included in the operating circuit of magnet 454. When the brushes on rotating arm 434 reach the No. 1 segments of rings 407 and 408, the circuit including the upper winding of relay 437 is again closed and the direction of current therein is determined by the positions of the No. 1 transfer elements of transmitting contact sets 401 and 404 which positions are determined by the nature of the first selecting pulse of each of the signal combinations respectively passing over the transmitting contacts 401 and 404 at the time. The direction of the current flowing through the upper winding of relay 437 again determines the position to which the relay armature is operated, whereby a circuit is accordingly conditioned to operate either the selector magnet 453 or dummy magnet 454. When the brushes on rotating arm 434 move out of engagement with the No. 1 segments of rings 407 and 408 and into engagement with segments Nos. 1A, the circuit including the upper winding of relay 437 is opened and the circuit previously conditioned is closed to operate either selector magnet 453 or dummy magnet 454 depending upon the position of the relay armature at the time. The magnet operating circuit is traceable from grounded positive battery 435, segments Nos. 1A of rings 407 and 408, conductors 436 and 456, armature in engagement with either its marking, or lower, contact, or its spacing, or upper, contact, of relay 437, through spring No. 4 or No. 5 of switch 411, through the winding of either magnet and its associated resistor of low resistance value, to grounded negative battery 460. Current flowing in the circuit just traced also flows in a high resistance path parallel to the circuit just traced which path extends through the lower winding of relay 437, to grounded negative battery 460. Because of the high resistance values of the resistors adjacent to the lower winding of relay 437, current flowing in the lower winding is very light but of sufficient strength to maintain the armature of relay 437 in the position to which it was last operated by the current flowing through the upper winding of the relay. Therefore the lower winding of relay 437 serves to hold the relay in the position to which it was last operated and hold it in such position until the current in the upper winding flows in the opposite direction to that which operated the relay to such position.

Figure 6:
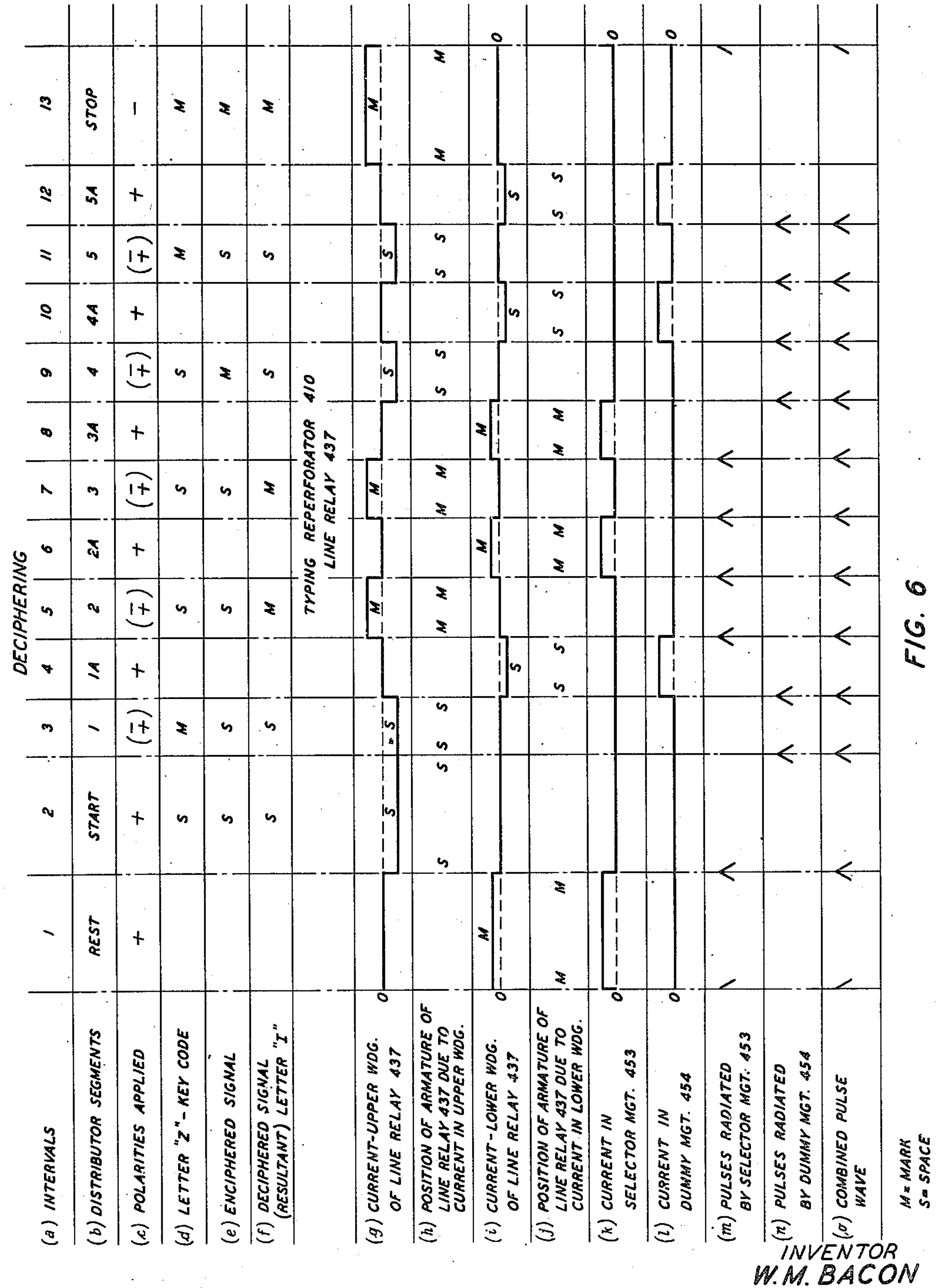
Fig. 6 is a diagrammatic showing of a signal wave and the voltage pulse pick-up waves involved in the deciphering process.

A clearer understanding of the deciphering operation is had by referring to the signal chart shown in Fig. 6. Fig. 6 shows line *a* to *o* which furnish the following information:

Line *a* shows the number of intervals, consecutively numbered, wherein different functions are performed by the rotating brushes moving through one revolution over the segments of each of rings 407 and 408 of the distributor.

Line *b* shows the designation of the segments of each of rings 407, 408 for transmitting a start-stop, five unit permutation code signal combination. The brushes on rotatable arm 434 are normally in engagement with the rest segments. When the brushes start rotating they pass over, in turn, the start segments, segments No. 1 corresponding to the first selecting impulse of the signal combination, segments 1A referred to herein as holding segments, segments No. 2 which correspond to the second selecting impulse, segments 2A which are another pair of holding segments, segments No. 3 which correspond to the third selecting impulse, segments No. 3A which are still another pair of holding segments, segments No. 4 which correspond to the fourth selecting impulse, segments No. 4A are another pair of holding segments, segments No. 5 which correspond to the fifth selecting impulse, segments Nos. 5A which are another pair of holding segments and the stop segments to which the negative polarity of grounded negative battery 438 is applied for restoring relay 437 to its marking position before the brushes come to rest on the rest segments. The positive pole of grounded positive battery 435 is connected to the rest segments for normally maintaining selector magnet 453 in its operated position.

Line *c* shows the polarities successively applied to the segments of ring 407 during the time the brushes are rotating through one revolution. The positive pole of battery 435 is always connected to the rest segment, and in turn, when the brush arm 434 rotates through a revolution, to the start segment and each of the hold segments Nos. 1A, 2A, 3A, 4A and 5A. The positive pole of battery 465, or the negative pole from battery 464 is successively connected to each of selecting segments Nos. 1, 2, 3, 4 and 5, depending on whether the mark, or lower, contact or the space, or upper, contact is engaged by its respective swinger of those designated Nos. 1 to 5 of transmitting contacts 404. The negative pole of battery 439 is always connected to the stop segment.

Line *d* shows the signal combination for the letter "Z" which represents a character of the key code. The start-stop combination for letter "Z" including the start and the stop impulse consists of space, mark, space, space, space, mark and mark, the start and the stop impulses being space and mark, respectively, in accordance with the usual practice.

Line *e* shows the enciphered signal which is a combination of impulses that is to be deciphered by means of the key code. In other words, the selecting impulses of a signal combination of a key code as applied by transmitting contacts 404 are superimposed, in turn, on their corresponding selecting impulses of a signal combination of the enciphered message as applied by transmitting contacts 401, for transmission over the operating circuit of relay 437 which circuit includes the upper winding of the relay. It will be noted, as hereinbefore stated in the description of Fig. 3, that when a selecting impulse is combined with another impulse of like nature, the resultant is a "mark" but if the selecting impulse is combined with a selecting impulse of a different nature, the resultant will be a "space." However, these changes affect only the selecting impulses of a signal combination, the "start" impulse and the "stop" impulse remain the same, that is, space and mark respectively.

Line *f* shows the deciphered signal combination for the letter "I" which represents a letter of the plain text message which is reproduced at perforator 410 as a result of the deciphering operation. The start-stop combination for letter "I" consists of space, space, mark, mark, space, space and mark and in accordance with the general practice the start and the stop impulses are space and mark respectively.

Line *g* shows the nature and duration of each of the current impulses of line *e* as applied to the upper winding of line relay 437. When the brushes on rotating arm 434 rotate through one revolution to transmit the signal combination shown in line *e* there are performed various functions which are indicated in lines *h* to *o*. These functions are as follows:

(1) Normally the brushes on arm 434 are in engagment with the rest segments, and no current flows in the upper winding of relay 437, as indicated in interval No. 1 of line *g*, because the relay operating circuit is open at the distributor segments. The armature of relay 437 is normally in its marking, or lower, position as shown in interval No. 1 of line *j* because of a holding current normally flowing, from right to left, through the lower winding of relay 437, in a path parallel to a circuit extending from the positive pole of battery 435, the rest segments, conductors 436 and 456, armature and marking contact of relay 437, left-hand contact and spring No. 5 of switch 411, conductor 477, through the winding of selector magnet 453, resistor 458 of low resistance value, to grounded negative battery 460, to furnish a marking current as indicated in interval No. 1 of line *k*, whereby selector magnet 453 is normally maintained in an operated condition. The parallel path extending through the lower winding, in a right to left direction, of relay 437 includes resistors 461 and 462 which are of high resistance values, and resistor 463 which like resistor 459 is of low resistance value, and therefore, receives a small portion only of the current flowing through the winding of selector magnet 453, as indicated in interval No. 1 of line *i*, which portion is just sufficient to hold relay 437 in its marking position for the duration of interval No. 1 as indicated by means of the two "M's" shown in line *j*.

(2) In interval No. 2 when the brushes are in engagement with the start segments, positive polarity of battery 435 is applied to a circuit extending over the start segments, conductor 448, spring No. 2 and its left-hand contact of switch 411, conductor 472, through the upper winding, from right to left, of relay 437, to point 469 of negative potential furnished by batteries 473 and 474 to permit a spacing current indicated in line *g*, to operate relay 437 to its spacing position as indicated by means of the two "S's" shown in line *h*. No current flows in the lower winding of relay 437 as shown in line *i*.

(3) In interval No. 3 when the brushes are in engagement with the No. 1 segments to pick up the first selecting impulse of each of the signal combinations appearing at each set of transmitting contacts, that is, "mark," at transmitting contact set 404 and "space" at transmitting contact set 401, positive polarity of battery 465 is applied over the marking contact and transfer element No. 1 of transmitting contact set 404, the No. 1 segments, transfer element No. 1 in engagement with the spacing contact of transmitting contact set 401, conductor 448, spring No. 2 and its left-hand contact of switch 411, conductor 472, through the upper winding of relay 437, in a right to left direction, to point 469 of negative potential to transmit a space impulse indicated in line *g*, and relay 437 is held in its spacing position as indicated by the two "S's" shown in line *h*. No current flows at this time in the lower winding as shown in line *i*.

(4) In interval No. 4 when the brushes are in engagement with the Nos. 1A segments, the current flowing through the upper winding, right to left, of relay 437, returns to zero value as indicated in line *g* and a space current now flows through the circuit traceable from grounded positive battery 435, segments Nos. 1A, conductors 436 and 456, armature and spacing contact of relay 437, conductor 475, left-hand contact and spring No. 4 of switch 411, conductor 476, through the winding of dummy magnet 454, as indicated in line *l*, resistor 463, of low resistance value, to grounded negative battery 460. The operating current for dummy magnet 454 also flows in the parallel path traceable through the lower winding, left to right, of relay 437, resistors 461 and 459, to grounded negative battery 460. The current in the parallel path at this time is spacing as indicated in line *i*, which holds relay 437 in its spacing position for the duration of interval No. 4 as indicated by the two "S's" in line *j*.

(5) In interval No. 5 when the brushes are in engagement with the Nos. 2 segments, a circuit is closed extending from grounded negative battery 464, spacing contact and transfer element No. 2 of transmitting contact set 401, segments No. 2, transfer element No. 2 and spacing contact of transmitting contact set 401, conductor 448, spring No. 2 at its left-hand contact of switch 411, conductor 472, through the upper winding, from right to left, of relay 437, to point 469 which is now of positive potential to furnish marking current for the second selecting impulse, as indicated in line *g* to operate relay 437 to its marking position as indicated in line *h*. No current flows at this time in the lower winding of relay 437 as indicated in line *i*.

(6) In interval No. 6 when the brushes come into engagement with segments Nos. 2A the current flowing through the upper winding from right to left, of relay 437 drops to zero value as indicated in line *g*, and marking current now flows through a circuit extending from grounded positive battery 435, segments Nos. 2A, conductors 436 and 456, armature and marking contacts of relay 437, conductor 457, left-hand contacts of spring No. 5 of switch 411, conductor 477, through the winding of selector magnet 453, indicated in line *k*, resistor 459 of low resistance value, to grounded negative battery 460 and magnet 453 operates. The operating current for selecting magnet 453, also follows the parallel path traceable through resistor 461, through the lower winding of relay 437, resistors 462 and 463 to grounded negative battery 460. The current flowing at this time in the lower winding of relay 437 is in a right to left direction, or marking, as indicated in line *i*, to hold relay 437 in its marking position for the duration of interval No. 6 as indicated in line *j*.

(7) In interval No. 7 when the brushes come into engagement with segments Nos. 3, a circuit is closed extending from grounded negative battery 464, spacing contact and transfer element No. 3 of transmitting contact set 404, segments Nos. 3, transfer element No. 3 and spacing contact of transmitting contact set 401, conductor 448, left-hand contacts of spring No. 2 of switch 411, conductor 472, through the upper winding, from left to right, of relay 437 to point 469 which remains at positive potential to furnish marking current for the third selecting impulse as indicated in line *g*, and relay 437 remains in its marking position as indicated in line *h*. No current flows in the lower winding of relay 437 as indicated in line *i*.

(8) In interval No. 8 when the brushes come into engagement with segments Nos. 2A the current flowing through the upper winding from left to right, of relay 437 again drops to zero value as indicated in line *g*, and marking current now flows in a circuit extending from grounded positive battery 435, segments Nos. 3A, conductors 436 and 456, armature and marking contact of relay 437, conductor 457, left-hand contact and spring No. 5 of switch 411, conductor 477, through the winding of selector magnet 453, resistor 459, to grounded negative battery 460 and the current as indicated in line *k* operates selector magnet 453. At the same time the operating current for selector magnet 453 also flows through the parallel path including resistor 461, lower winding, from right to left, of relay 437, resistors 462 and 463, grounded negative battery 460, the current as indicated in line *i*, flowing in the lower winding, from right to left, serving to hold relay 437 in a marking position for the duration of interval No. 8 as indicated in line *j*.

(9) In interval No. 9 when the brushes come into engagement with segments No. 4, a circuit is closed extending from grounded negative battery 464, spacing contact and transfer element No. 4 of transmitting contact set 404, segments No. 4, transfer element No. 4 and marking contact of transmitting contact set 401, conductor 466, spring No. 3 at its left-hand contact of switch 411, conductor 479, through the upper winding, from right to left, of relay 437, to the point 469 which is still of positive potential to furnish at this time a spacing current representing the fourth selecting impulse as indicated in line *g*, and serving to operate relay 437 at this time to its spacing position as indicated in line *h*. No current flows in the lower winding of relay 437 as indicated in line *i*.

(10) In interval No. 10 when the brushes come into engagement with segments Nos. 4A, the current flowing through the upper winding, from right to left, of relay 437 returns to zero value as indicated in line *g* and spacing current now flows, a circuit extending from grounded positive battery 435, segments Nos. 4A, conductors 436 and 456, armature and spacing contact of relay 437, conductor 475, left-hand contact and spring No. 4 of switch 411, conductor 476, through the winding of dummy magnet 454, resistor 463, to grounded negative battery 460. The spacing current indicated in line *l*, operates dummy magnet 454. At the same time the operating current for dummy magnet 454 also flows through the parallel path traceable through resistor 462, through the lower winding, from left to right, of relay spacing 437, resistors 461 and 459, to grounded negative battery 460, as indicated in line *i*. The current flowing through the lower winding, from left to right, of relay 437 serves to hold the relay in its spacing position for the duration of interval No. 10 as indicated in line *j*.

(11) In interval No. 11 when the brushes come into engagement with segments No. 5 a circuit is closed extending from grounded positive battery 465, marking contact and transfer element No. 5 of transmitting contact set 404, segments No. 5, transfer element No. 4 and spacing contact of transmitting contact set 401, conductor 448, spring No. 2 and left-hand contact of switch 411, conductor 448, spring No. 2 and left-hand contact of switch 411, conductor 472, through the upper winding, from right to left, of relay 437 to point 469 of negative potential to furnish at this time a spacing current representing the fifth selecting impulse as indicated in line *g* and relay 437 therefore remains in its spacing position for the duration of interval No. 11 as indicated in line *h*.

(12) In interval No. 12 when the brushes come into engagement with segments No. 5A the current flowing through the upper winding, from right to left, of relay 437 returns to zero value as indicated in line *g* and spacing current now flows in a circuit which is closed from grounded positive battery 435, segments No. 5A, conductors 456 and 436, armature and spacing contact of relay 437, conductor 475, left-hand contact and spring No. 4 of switch 411, conductor 476, through the winding of dummy magnet 474, resistor 463, to grounded negative battery 460 and the spacing current as indicated in line *l*, operates dummy magnet 454 for the duration of interval No. 12. The operating current for dummy magnet 454 also flows as indicated in line *i*, through the parallel path extending over resistor 462, through the lower winding, from left to right, of relay 437, resistors 461 and 459 to grounded negative battery 460 to hold relay 437 in its spacing position for the duration of interval No. 12 as indicated in line *j*.

(13) In interval No. 13 when the brushes come into engagement with the stop segments, a circuit is closed from grounded negative battery 439, the stop segments, conductor 448, spring No. 2 and left-hand contact of switch 411, conductor 472, through the upper winding, from left to right, of relay 437, to point 469 of positive potential to furnish at this time a marking current representing the "stop" impulse as indicated in line *g*. This marking current operates relay 437 to its marking position as indicated in line *h*. No current flows at this time in the lower winding of relay 437 as indicated in line *i*.

(14) Upon returning to interval No. 1 the brushes again come into engagement with the rest segments, and a circuit is thereby closed from grounded positive battery 435, the rest segments, conductors 436 and 456, armature and marking contact of relay 437, conductor 457, left-hand contacts and spring No. 4 of switch 411, conductor 477, through the winding of selector magnet 453, resistor 459, to grounded negative battery 460, and this marking current as indicated in line *k* operates selector magnet 453. This marking current for operating selector magnet 453 also flows through a path including resistor 461, through the lower winding, from right to left, of relay 437, resistors 462 and 463, to grounded negative battery 460. The marking current flowing through the lower winding, from right to left, of relay 437 is indicated in line *i* and holds the relay in its marking position as indicated in line *j* as long as the brushes remain on the rest segments, that is, until another signal combination is received from the transmitter contact sets 401 and 404.

By observing the intervals wherein current is flowing in either the selector magnet or the dummy magnet as indicated in line *k* or line *l*, it will be noted that the operating current has a duration of one interval only so that each of these magnets will release at the termination of each interval wherein the magnet is energized. It will be noted in lines *m* and *n* that a short, sharp voltage pulse is radiated each time either magnet operates or releases and therefore, at each possible transition of a signal wave corresponding to the signal combination indicated in line *f*, a short, sharp voltage pulse is radiated and may be recorded at a radio receiver conveniently located with respect to the deciphering equipment shown in Fig. 1. In line *o* is indicated the combined pick-up at the radio receiver of the pulses radiated by the operating circuits of both magnets. The combined pick-up wave will be the same for all signal combinations in this case also to eliminate any chance of detection of a secret message during the deciphering operation.

What is claimed is:

1. A device for use with secret telegraph systems comprising transmitting sets for sending permutative code signals, recording sets, a polar relay and magnets controlled thereby in each of said recording sets, distributing means, switching means for selecting, as desired, one or another of said recording sets for connection to said distributing means, an operable element for starting said transmitting sets and said distributing means simultaneously, rotatable means in said distributing means controlled by said operable means for combining signal impulses simultaneously received from said transmitting sets to produce a single signal of polar impulses for causing the polar relay of the selected one of said recording sets to follow the polar impulses of said single signal, other means in said distributing means cooperating with said rotatable means for discontinuing each polar impulse of said single signal, and for furnishing current for operating either of the magnets of said selected one recording set and holding said polar relay in the position to which it was last operated until the next polar impulse is received from said distributing means, means controlled by one of said magnets for recording the single signal, and an operating circuit connected to said other means and having parallel paths for respectively operating the magnets of said selected one of said recording sets for radiating voltage impulses at each possible transition in the signal wave of said single signal.

2. A device for use with secret telegraph systems comprising transmitting sets for sending permutative code signals, recording sets, a polar relay and magnets controlled thereby in each of said recording sets, distributing means, switching means for selecting, as desired, one or the other of said recording sets for connection to said distributing means, an operable element for starting said transmitting sets and said distributing means simultaneously, rotatable means in said distributing means controlled by said operable means for combining signal impulses simultaneously received from said transmitting sets to produce a single signal of polar impulses, an armature operable between two positions on the polar relay of the selected one of said recording sets arranged to follow the polar impulses of said single signal, other means in said switching means cooperating with said rotatable means for discontinuing each polar impulse of said single signal, and for furnishing current for operating either of said magnets of said selected one of said recording sets and holding said polar relay in the position to which it was last operated until the next polar impulse is received from said distributing means, key operated means included in one of said recording sets, means in said switching means when operated to effectively connect another of said recording sets to said distributing means, arranged to effectively connect said one recording set to said key operated means without interference with transmission to said other recording set, means controlled by a magnet in said other recording set and said one recording set for recording signals, and means controlled by said magnets in each of said recording sets for a radiating voltage impulse at each possible transition of the signal wave of each single signal received by its receiving set.

3. A device for use with secret telegraph systems comprising signal transmitting sets, recording sets, a polar relay and magnets controlled thereby in each of said recording sets, distributing means, switching means for selecting, as desired, one or the other of said recording sets for connection to said distributing means, an operable element for starting said transmitting sets and said distributing means simultaneously, rotatable means in said distributing means controlled by said operable means for combining signal impulses simultaneously received from said transmitting sets to produce a single signal combination of polar impulses, an armature operable between two positions on the polar relay of the selected one of said recording sets arranged to follow the polar characteristic of said single signal, segmented means controlled by said rotatable means for holding the polar relay of said selected one of said recording sets and either of said magnets operated thereby in operated positions for a predetermined interval after each impulse of said single signal combination has been received and for releasing the operated magnet at the end of said predetermined interval, means controlled by one magnet of each of said recording sets for recording signals received from said distributing means, an operating circuit for each of said magnets of each of said recording sets for radiating a voltage impulse at every possible transition in the signal wave of said single signal received from said distributing means.

4. A device for use with secret telegraph systems comprising transmitting sets for sending permutative code signals of mark and space impulses, recording sets, each of said recording sets including a polar relay, a work circuit and a dummy circuit having electrical characteristics identical therewith controlled by said relay, a magnet controlled by each of said circuits, distributing means, switching means for selecting, as desired, any one of said recording sets for connection to said distributing means, an operable element for starting said transmitting sets and said distributing means simultaneously, rotatable means in said distributing means controlled by said operable means for combining the signals simultaneously received from said transmitting sets to produce a single signal of mark and space impulses, a circuit including a winding of the polar relay of the selected one of said recording sets for causing the polar relay to follow the mark and the space characteristic of said single signal, a second circuit prepared by the polar relay in its mark position for operating the magnet in the work circuit and in its space position for operating the magnet in its dummy circuit and closed momentarily under control of said rotatable means after each impulse of said single signal is received in the first-mentioned circuit, a parallel path in said second circuit for maintaining the polar relay in its last operated position until the next impulse of said single signal is received in the first-mentioned circuit, said second circuit of each recording set having means arranged to operate one magnet for the marking impulses and the other magnet for the space impulses in non-overlapping time relation for successive pulses whereby the patterns of energy radiated from any of said recording sets for like number of pulses in any of said single signal combinations of mark and space impulses are identical.

5. In a telegraph system, a tape sensing mechanism, a signal responsive relay having an armature engageable with either of two contacts, a signal responsive recorder operable through one of said contacts, and a distributor having spaced segments for controlling said relay according to said tape sensing mechanism and having other segments individually disposed between each two of said first-mentioned segments for applying to said armature an operating potential for said recorder.

6. In a cipher telegraph system, a tape sensing mechanism for sensing tape containing a message sequence of code combinations, a tape sensing mechanism for sensing a tape containing a key code sequence of code combinations, a distributor having means for intercombining code combinations sensed by said two tape sensing mechanisms, an electromagnetic work element having an operating circuit, an electromagnetic dummy element having an operating circuit, a signal relay responsive to a signal product of an intercombination of code combinations simultaneously sensed by said mechanisms to prepare one or the other of said circuits for operation in accordance with said intercombined signals, and means in said distributor for completing the prepared one of said circuits.

7. In a cipher telegraph system, a tape sensing mechanism for sensing a tape containing a message sequence of code combinations, a tape sensing mechanism for sensing a tape containing a key code sequence of code combinations, a distributor having individual to each of said tape sensing mechanisms a segmented ring, said rings containing code segments connected to said tape sensing mechanisms and other segments alternating with said code segments, two transmission paths in a circuit including said other segments alternating with said code segments, a relay controlled through the code segments of said distributor and having an armature adapted to prepare either of said two signal transmission paths, and means including said other segments for completing the prepared one of said paths.

8. In a cipher system, a distributor having two segmented rings, a tape sensing mechanism adapted to sense either a plain text message tape or an enciphered message tape and arranged to selectively connect either of two polarities to certain segments of one of said rings, a polar signal responsive relay having two operating paths and two holding paths, another tape sensing mechanism adapted to sense a key code tape and arranged to selectively connect the corresponding segments of the other of said rings to either of said polar relay operating paths, and means in said distributor for interconnecting the corresponding certain segments of said two rings in succession whereby to intercombine signal characteristics by said two sensing mechanisms and operate said relay in accordance therewith, and for interconnecting the other of said segments of each of said rings in succession for applying a potential to either of said holding paths to thereby hold said relay in its last operated position until one or the other of said operating paths is again closed by said interconnecting means engaging the next succeeding pair of said corresponding certain segments of said rings.

9. In a cipher telegraph system, a tape sensing mechanism for sensing tape containing a message sequence of code combinations, a tape sensing mechanism for sensing a tape containing a key code sequence of code combinations, a distributor having means for intercombining code combinations sensed by said two tape mechanisms, a signal responsive relay having an armature engageable with either of two contacts, a signal responsive recorder operable through one of said contacts, two segmented rings included in said distributor, each having spaced segments for controlling said relay according to each code combination resulting from the intercombining of said message and said key code combinations and having other segments individually disposed between each of said spaced segments on its ring for applying to said armature an operating potential for said recorder.

10. In a cipher telegraph system, a signal receiver, a tape sensing mechanism for sensing a tape containing a message sequence of code combinations, a tape sensing mechanism for sensing a tape containing a key code sequence of code combinations, a distributor having individual to each of said tape sensing mechanisms a segmented ring, said rings having code segments connected to said tape sensing mechanisms and other segments alternating with said code segments, a circuit connected to said other segments, two transmission paths included in said circuit, a relay controlled through the code segments of said segmented rings and having an armature, and means for applying to said armature over either of said transmission paths an operating potential for said receiver.

WALTER M. BACON.

REFERENCES CITED

The following references are of record in the file of this patent:

UNITED STATES PATENTS

| Number | Name | Date |
|---|---|---|
| 1,310,719 | Vernam | July 22, 1919 |
| 1,320,908 | Parker | Nov. 4, 1919 |
| 1,416,765 | Vernam | May 23, 1922 |
| 1,686,585 | Varnem | Oct. 9, 1928 |
| 2,103,297 | Nulson et al. | Dec. 28, 1937 |
| 2,406,829 | Haglund et al. | Sept. 3, 1946 |
| 2,406,978 | Wendt | Sept. 3, 1946 |

FOREIGN PATENTS

| Number | Country | Date |
|---|---|---|
| 371,087 | Germany | Mar. 10, 1923 |